United States Patent [19]

Wieland, Jr.

[11] 4,002,876
[45] Jan. 11, 1977

[54] STUD WELDING TOOL WITH RETRACTION MECHANISM

[75] Inventor: Howard N. Wieland, Jr., Amherst, Ohio

[73] Assignee: TRW Inc., Cleveland, Ohio

[22] Filed: June 30, 1975

[21] Appl. No.: 591,755

[52] U.S. Cl. .................................. 219/98; 219/99
[51] Int. Cl.² ......................................... B23K 9/20
[58] Field of Search ................. 219/95, 96, 97, 98, 219/99, 100; 254/21, 22

[56] References Cited

UNITED STATES PATENTS

| 2,474,531 | 6/1949 | Keir et al. | 219/98 |
| 2,976,608 | 3/1961 | Busler | 254/21 X |
| 3,138,693 | 6/1964 | Buehler et al. | 219/95 |
| 3,733,457 | 5/1973 | Wieland | 219/98 |
| 3,774,005 | 11/1973 | Spisak | 219/98 |

Primary Examiner—J. V. Truhe
Assistant Examiner—N. D. Herkamp
Attorney, Agent, or Firm—Allen D. Gutchess, Jr.

[57] ABSTRACT

A welding tool is set forth for end welding studs to workpieces. The tool is primarily designed to end weld small studs having precisely-formed tips. The stud is held by a chuck connected to a chuck leg with an electrical coil holding the chuck leg in a retracted position prior to welding. When the coil is deenergized, a plunge spring plunges the chuck leg, the chuck, and the stud back toward the workpiece. With a high voltage imposed between the stud and the workpiece, the stud tip vaporizes when reaching the workpiece and adjacent portions of the stud and workpiece melt to securely weld the stud. To initially move the chuck and chuck leg to the retracted position, a retraction mechanism is provided. This includes a lever pivotally mounted at the front of the tool and engageable with a portion of the chuck leg to retract the chuck leg when the lever is manipulated by an operator. This reduces the retraction effort to increase the rate of welding and to reduce operator fatigue.

7 Claims, 3 Drawing Figures

STUD WELDING TOOL WITH RETRACTION MECHANISM

This invention relates to an improved tool for welding studs to workpieces.

A welding tool embodying the invention is designed to end weld a small stud having a precisely-formed tip to a workpiece. The stud is held in a chuck assembly of the tool, the assembly including a chuck leg and a chuck which holds the stud with the tip extending outwardly. An electrical coil within the body of the tool magnetically holds the chuck leg in a fixed, retracted position after the operator retracts the chuck assembly. When the coil is deenergized, a plunge spring, which is compressed when the chuck assembly is retracted, plunges the chuck leg, the chuck, and the stud back toward the workpiece. Before the stud contacts the workpiece, a high voltage is imposed between the stud and the workpiece by a capacitive power source. When the stud reaches the workpiece, the tip is vaporized and adjacent portions of the stud and the workpiece melt, with the stud becoming securely welded thereto.

The present invention provides a retraction mechanism for a welding tool of the type described for end welding small tipped studs to workpieces. The chuck assembly of the tool has a flange or disc thereon which is used to move the chuck assembly to the retracted position where it is held by the electrical coil. Heretofore, the flange has been grasped by the fingers of the operator and pulled rearwardly, overcoming the force of the plunge spring. When the studs are welded over a period of time, this has resulted in considerable operator fatigue and has slowed down the frequency of welds. The new retraction mechanism is in the form of a lever pivotally mounted on a forward portion of the welding tool and engagable with the flange or disc previously pulled back by the operator's fingers. The lever preferably is pivotally mounted on one side of the chuck leg and has legs extending around the chuck leg to the opposite side where they terminate in a handle. This handle can be comfortably engaged by the fingers or, preferably, the palm of the operator's hand to more readily and easily retract the chuck leg assembly, the handle providing a comfortable area for accomplishing same and the lever providing a mechanical advantage to reduce the effort. A spring can be associated with the lever for moving it forwardly to a position in front of the forward position of the chuck assembly so not to interfere with the welding operation after the chuck assembly has been retracted.

It is, therefore, a principal object of the invention to provide a stud welding tool having a retraction mechanism which reduces operator fatigue and increases the welding rate.

Another object of the invention is to provide a welding tool with a retraction lever for moving the chuck assembly of the tool to a retracted position.

A further object of the invention is to provide a welding tool with a retraction lever having resilient means for moving the lever out of the way of the chuck assembly during the welding operation.

Many other objects and advantages of the invention will be apparent from the following detailed description of a preferred embodiment thereof, reference being made to the accompanying drawings, in which.

Figure 1:
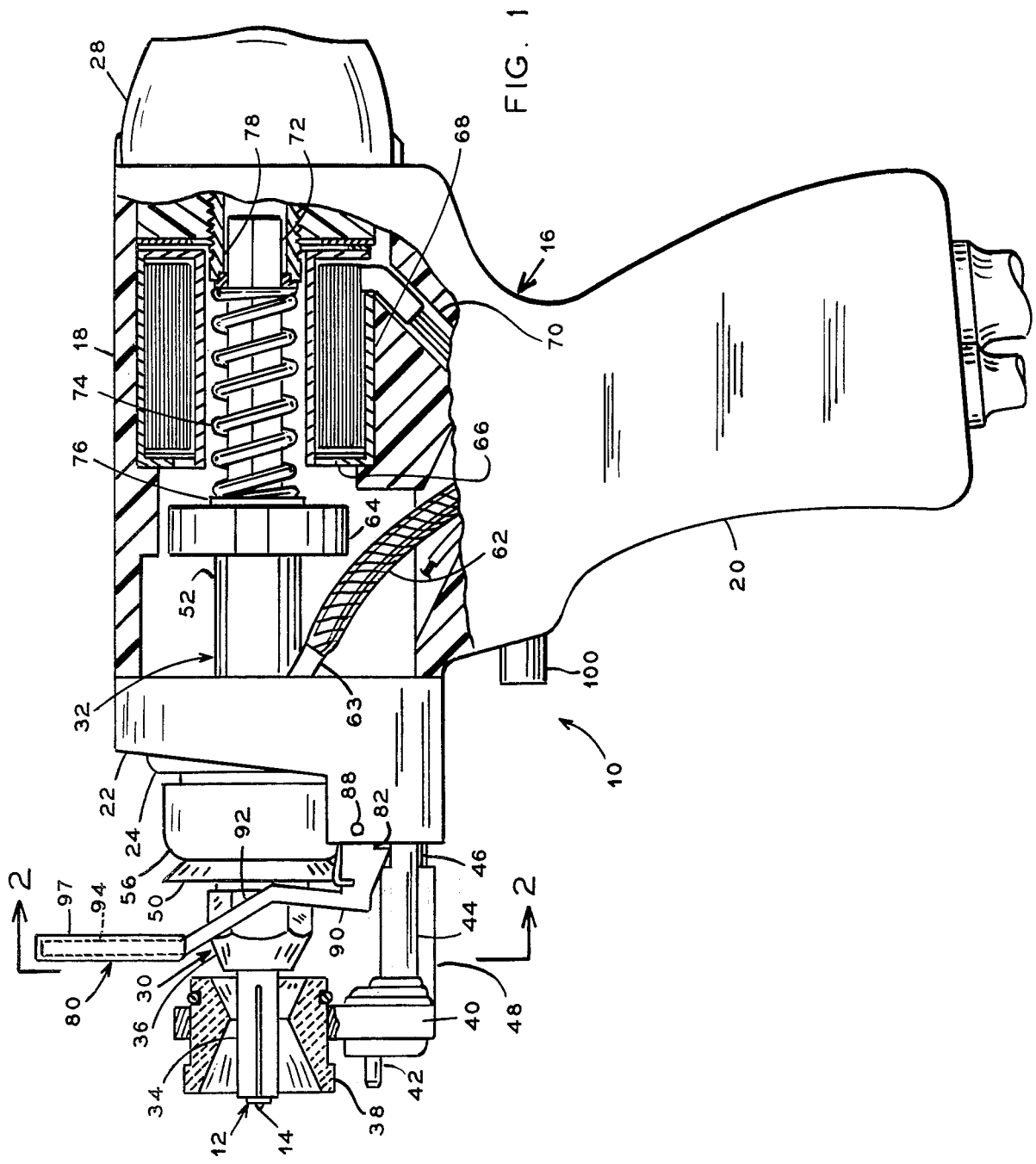
FIG. 1 is a side view in elevation, with parts broken away and with parts in section, of a welding tool embodying the invention.

Referring to the drawings, and particularly FIG. 1, a stud welding tool embodying the invention is indicated at 10 and is designed to weld a stud 12 having a precisely-formed tip 14 to a workpiece. The tool has means for holding a stud in a position retracted from the workpiece and means for plunging the stud toward and against the workpiece. Before the stud is plunged against the workpiece, a high voltage is imposed between them so that when the stud approaches the workpiece, the tip 14 is vaporized and an arc is established between the stud and the workpiece. This melts adjacent portions of the stud and the workpiece to weld the stud firmly thereto.

Figure 2:
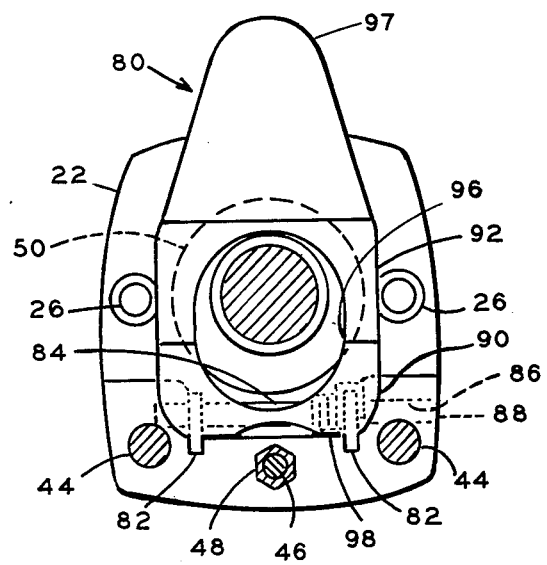
FIG. 2 is a front view in elevation of a portion of the welding tool, taken along the line 2—2 of FIG. 1.

The tool 10 has a main body or housing 16 which includes a central portion 18 of suitable dielectric material and an integral pistol grip 20. The body 16 further includes a front metal frame 22 holding a central front wall 24 which is also of dielectric material. The frame 22 is affixed to the central body portion 18 by side fasteners 26 (FIG. 2). A separate end cap 28 closes off the rear of the central body portion 18.

A chuck assembly 30 is located at the front of the tool 10 and comprises a chuck leg 32 and a chuck 34 which holds the stud 12 at the front of the tool during the welding operation. The chuck 34 is removably mounted on the forward end of the chuck leg 32 by a suitable chuck nut 36 engaged with a threaded end of the leg 32. The front end of the chuck 34 is surrounded by a permanent spark shield 38 carried by a welding foot 40. The spark shield 38 can float toward and away from the body 16, relative to the foot 40, to assure that the outer annular end of the shield will be against the workpiece during the welding cycle, when the tool is in the downhand welding position. The floating spark shield also eliminates the need for precise tolerances on the shield and also on three positioning posts or feet 42 as are otherwise required to make certain both the shield and the post are in the same plane. The welding foot is adjustably supported by two supporting legs 44 which extend through the metal frame 22, being affixed thereto by suitable setscrews or the like (not shown).

The position of the stud 12 and the spark shield 38 is determined by the positioning posts 42. When the stud is in its outermost position, it preferably extends slightly beyond the plane of the positioning posts 42 so that the stud and the chuck assembly 30 are depressed slightly when the stud is pressed against the workpiece and the posts 42 abut the workpiece. This assures that the stud will plunge back against the workpiece during the welding operation. The position of the spark shield 38 and the welding foot 40 relative to the tool body 16 is determined by a threaded rod 46 and a forward internally threaded sleeve 48. The rod 46 is threadably engaged in a central lower portion of the metal frame 22 and extends forwardly thereof. The sleeve 48 is received on the rod 46 and has a forward end abutting the rear surface of the foot 40. To adjust the position of the foot 40, the setscrews for the legs 44 are loosened and the legs moved in or out to position the rear surface of the foot against the forward end of the sleeve 48. The sleeve 48 can have a hexagonal outer surface so that when the sleeve is turned one-sixth of a revolution in either direction, it adjusts the foot 40 a predetermined amount in or out, e.g. 0.005 inch.

Referring in more detail to the chuck assembly 30, a retract flange or disc 50 is located on the forward threaded end of the chuck leg 32 behind the chuck nut 36. A cylindrical portion 52 of the chuck leg extends rearwardly into the main body portion 18, being slidably carried in a central bearing 54 (FIG. 3) in the forward wall 24. A flexible bellows 56 is located between the flange 50 and the bearing 54 for protection against dirt. Behind the bearing 54, the cylindrical portion 52 of the chuck leg has an upwardly-extending pin 58 received in a groove 60 of the front wall 24 to prevent rotation of the leg and to limit the maximum forward position of it. On the lower side of the cylindrical portion 52, a welding cable 62 is suitably affixed by a terminal 63. At the rear of the cylindrical portion 52 is a magnetic flange 64 extending outwardly beyond the cylindrical portion 52. When the chuck assembly 30 is in the retracted position, the flange 64 is held against an annular face 66 of an electric coil 68 having suitable conductors 70 extending downwardly through the grip 20.

The chuck leg 32 has a rearwardly-extending shank 72 behind the magnetic flange 64. A coiled plunge 74 is located on the shank 72, being between a forward seat 76 and a rear adjustable sleeve 78 which can be moved forward and backward to change the load on the spring 74. The manner of adjustment for the sleeve 78 is disclosed in more detail in a co-pending application of Wieland et al, Serial No. 521,183, which is assigned to the same assignee as the instant application.

Figure 3:
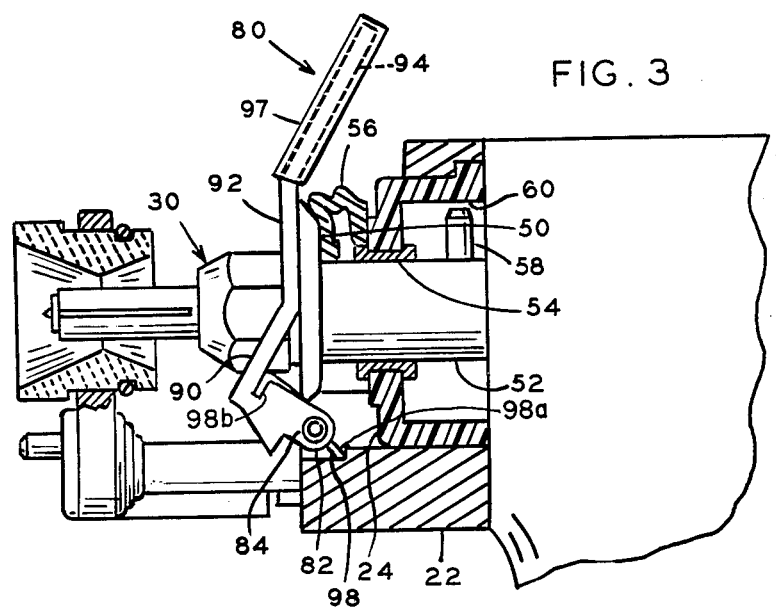
FIG. 3 is a fragmentary view of the welding tool of FIG. 1 with certain components in different positions.

Heretofore, the chuck assembly 30 was moved from the forward position, as in FIG. 1, to the retracted position of FIG. 3 by pulling the flange 50 rearwardly. This was ordinarily done by two fingers of the operator's hand. Over a period of time, after numerous welds, considerable operator fatigue often resulted and the welding rate accordingly slowed down.

In accordance with the invention, the retraction mechanism for the chuck assembly 30 includes a retraction lever 80 which is located in front of the flange 50 and is pivotally connected to a lower portion of the metal frame 22. The lever 80 includes two rearwardly-extending ears 82 which are pivotally supported by the metal frame 22 through a pin 84. The pin is inserted through passages 86 in the frame 22 and is held therein by a setscrew 88. The ears 82 extend rearwardly from a lower portion 90 of the lever 80 which is structurally integral with an intermediate offset portion 92 which, in turn, is structurally integral with an upper handle 94. An opening 96 is formed in the lower portion 90 and the offset portion 92 to receive the chuck assembly 30 and specifically the chuck nut 36. The handle 94 has a covering 97 of dielectric material for insulating purposes. This can be produced by dipping the handle 94 in a suitable liquid plastic material.

A torsion spring 98 is located around a portion of the pin 84 adjacent one of the ears 82. The torsion spring has one end 982 bearing against the frame 22 (FIG. 3) and another end 98b bearing against the ear 82 of the lever so as to urge the lever 80 forwardly such that it is beyond or in front of the flange 50, as shown in FIG. 1, when the chuck assembly 30 is in its maximum forward position. This prevents the possibility of any interference of the lever 80 with the welding operation. When the lever 80 is in the maximum forward position, as urged by the torsion spring 98, the lower edge of the lower portion 90 of the lever rests on the adjusting sleeve 48. It is also possible for the lever to be equipped with tabs which rest on the supporting legs 44, if desired, or the ears 82 can have offsets which bear against portions of the metal frame 22 to determine the maximum forward position.

With the lever 80, the force required to retract the chuck assembly 30 is substantially reduced. Further, the handle 96 can be pushed rearwardly by the palm of the hand of the operator, rather than the fingers. Consequently, operator fatigue is reduced and the welding rate of the tool can be maintained higher for a longer period of time. Each welding cycle can also be conducted more rapidly since the chuck assembly can be retracted faster.

In the operation of the tool 10, with the welding foot 40 properly positioned by the adjusting sleeve 48, the welding legs 44 are affixed by the setscrews (not shown) relative to the frame 22. This position of the foot determines the length of the plunge stroke of the stud 12 and the chuck assembly 30. The rear limit of the plunge stroke is always fixed, being with the flange 64 against the forward face 66 of the coil 68. The operator can then retract the chuck assembly 30 by pushing the lever 80 rearwardly against the flange 50 until the magnetic flange 64 engages the coil face 66. At this time, the coil has been energized so as to maintain the chuck assembly in the rear position.

When a trigger 100 is pulled, power to the electrical coil 68 is cut off and a high voltage potential from a capacitive power source is imposed through the cable 60 between the stud 12 and the workpiece when the positioning posts 42 are in contact with the workpiece. When the coil is off, the plunge spring 74 moves the chuck assembly 30 and the stud 12 toward the workpiece, with the force of the plunge stroke determined by the amount of compression on the spring. As the chuck assembly and the stud move forwardly, current will pass through the tip 14 as it contacts the workpiece. This vaporizes the tip and causes an arc to exist for a short time between the stud and the workpiece, until the stud contacts the workpiece. The tip and adjacent portions of the stud and the workpiece become molten to provide a secure weld between the stud and the workpiece.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. In a tool for welding a stud to a workpiece, a tool body, a chuck leg supported for longitudinal movement with respect to said body, a chuck, means connecting said chuck to an end of said chuck leg with said chuck extending beyond a forward end of said tool body, resilient means in said tool body for urging said chuck leg toward a forward position, means in said tool body for holding said chuck leg and said chuck leg in a retracted position, a lever located in front of said tool body and engageable with a portion of said chuck leg for moving said chuck leg and said chuck from a forward position to the retracted position, said lever having an opening therein through which said chuck leg extends, means pivotally supporting said lever at one side of said opening by said tool body, and said lever having a handle extending to the side of said opening opposite said pivot means.

2. A tool according to claim 1 characterized by a spring engageable with said lever for moving said lever to a forward position beyond the forward position of said chuck leg when the lever is released by an operator.

3. A tool according to claim 1 characterized by said handle having a cover of insulating material thereon.

4. In a tool for welding a stud to a workpiece, a tool body, a chuck leg supported for longitudinal movement with respect to said body, a chuck, means connecting said chuck to an end of said chuck leg with said chuck extending beyond a forward end of said tool body, resilient means in said tool body for urging said chuck leg toward a forward position, means in said tool body for holding said chuck leg and said chuck in a retracted position, a lever located in front of said tool body and engagable with a portion of said chuck leg for moving said chuck leg and said chuck from a forward position to the retracted position, means for movably supporting said lever by said tool body, and a spring engageable with said lever and said tool body for moving said lever to a forward position beyond the forward position of said chuck leg when said lever is released by an operator.

5. A tool according to claim 4 characterized by said lever having means engageable with said tool for determining the forward position of said lever.

6. In a tool for welding a stud to a workpiece, a tool body, a chuck leg supported for longitudinal movement with respect to said body, a chuck, means connecting said chuck to an end of said chuck leg with said chuck extending beyond a forward end of said tool body, a welding foot, means for supporting said welding foot relative to said tool body, spark shielding means carried by said welding foot around said chuck, a spring in said tool body around a rear portion of said chuck leg and urging said chuck leg and said chuck toward a forward position with the forward end of said chuck extending beyond said spark shielding means, means in said tool body for holding said chuck leg and said chuck in a retracted position with the chuck spaced to the rear of the forward edge of said spark shielding means, a lever located in front of said tool body and engagable with a portion of said chuck leg for moving said chuck leg and said chuck from said forward position to said retracted position, means for pivotally supporting said lever by said tool body, and resilient means engageable with said lever for urging said lever toward a forward position beyond the forward position of said chuck leg when said lever is not engaged by an operator.

7. A tool according to claim 6 characterized by said lever having means engageable with said tool for determining the forward position of said lever.

* * * * *

UNITED STATES PATENT AND TRADEMARK OFFICE
CERTIFICATE OF CORRECTION

PATENT NO. : 4,002,876
DATED : January 11, 1977
INVENTOR(S) : Howard N. Wieland, Jr.

It is certified that error appears in the above-identified patent and that said Letters Patent are hereby corrected as shown below:

Column 3, line 23, before "74" insert --spring--.

Column 3, line 58, for "982" substitute --98a--.

Signed and Sealed this

Fifth Day of April 1977

[SEAL]

Attest:

RUTH C. MASON
Attesting Officer

C. MARSHALL DANN
Commissioner of Patents and Trademarks